(12) United States Patent
Fujii et al.

(10) Patent No.: US 7,625,106 B2
(45) Date of Patent: Dec. 1, 2009

(54) HEAT RADIATING STRUCTURE FOR USE IN IMAGE PROJECTING APPARATUS

(75) Inventors: Hiroaki Fujii, Kanagawa (JP); Kazuhiko Takatsuka, Kanagawa (JP); Akihito Yajima, Kanagawa (JP); Yoshiro Asano, Chiba (JP)

(73) Assignee: Sony Corporation (JP)

( * ) Notice: Subject to any disclaimer, the term of this patent is extended or adjusted under 35 U.S.C. 154(b) by 270 days.

(21) Appl. No.: 11/498,423

(22) Filed: Aug. 3, 2006

(65) Prior Publication Data

US 2007/0041196 A1    Feb. 22, 2007

(30) Foreign Application Priority Data

Aug. 16, 2005    (JP)    ............................ P2005-236046

(51) Int. Cl.
*B60Q 1/06* (2006.01)

(52) U.S. Cl. ............................ 362/373; 362/6; 362/218; 362/264; 362/294; 352/202

(58) Field of Classification Search ........................ None
See application file for complete search history.

(56) References Cited

U.S. PATENT DOCUMENTS

| | | | | |
|---|---|---|---|---|
| 1,677,521 A | * | 7/1928 | Hall | ............................ 362/262 |
| 2,257,232 A | * | 9/1941 | Flint et al. | .................. 362/294 |
| 2,385,526 A | * | 9/1945 | McNabb | ..................... 362/294 |
| 2,452,646 A | * | 11/1948 | Frankel | ...................... 362/294 |
| 2,618,738 A | * | 11/1952 | Foulds | ......................... 362/294 |
| 3,461,282 A | * | 8/1969 | Martinez | .................... 362/572 |
| 7,316,487 B2 | * | 1/2008 | Hirata et al. | ............... 362/345 |

FOREIGN PATENT DOCUMENTS

| | | |
|---|---|---|
| CN | 2565049 Y | 8/2003 |
| JP | 2720253 B2 | 2/1994 |
| JP | 2002-352612 | 12/2002 |
| JP | 2005-031549 A | 2/2005 |

* cited by examiner

*Primary Examiner*—Bao Q Truong
*Assistant Examiner*—Danielle Allen
(74) *Attorney, Agent, or Firm*—Lerner, David, Littenberg, Krumholz & Mentlik, LLP

(57) ABSTRACT

Disclosed herein is a heat radiating structure for radiating the heat generated by a lamp in an image projecting apparatus for projecting an image onto a screen to display the image thereon, including a heat sink for radiating heat generated by the lamp, the heat sink including heat transfer means for transferring the heat from the lamp, the heat transfer means being held in close contact with the lamp, heat storage means for storing the heat transferred from the lamp through the heat transfer means, and a plurality of fins serving as heat radiating means for radiating the heat stored by the heat storage means, wherein the heat transfer means, the heat storage means, and the heat radiating means are of a separable structure.

17 Claims, 11 Drawing Sheets

HEAT RADIATING STRUCTURE FOR USE IN IMAGE PROJECTING APPARATUS

CROSS REFERENCES TO RELATED APPLICATIONS

The present invention contains subject matter related to Japanese Patent Application JP 2005-236046 filed in the Japanese Patent Office on Aug. 16, 2005, the entire contents of which being incorporated herein by reference.

BACKGROUND OF THE INVENTION

1. Field of the Invention

The present invention relates to a heat radiating structure for efficiently radiating the heat generated by a lamp as a light source to cool the lamp in an image projecting apparatus for projecting an image onto a screen to display the image thereon.

2. Description of the Related Art

Image projecting apparatus have a lamp as a light source which is a largest heat source. For cooling the lamp, the image projecting apparatus need to have an efficient heat radiating structure. One heat radiating structure includes a heat sink of metal mounted on the surface of the lamp. Heat is transferred and radiated from the lamp to the heat sink to cool the lamp.

The heat radiating structures in the past where a heat sink is mounted on a lamp are disclosed in Japanese patent No. 2720253 and Japanese patent laid-open No. 2005-31549, for example.

SUMMARY OF THE INVENTION

According to the heat radiating structures in the past, the heat sink is of a unitary structure from its portion mounted on the lamp as the heat source to heat radiating fins. Therefore, it is difficult for the heat radiating structures in the past to be held in close contact with and to provide a sufficient heat radiating capability for all of a plurality of types of lamps having different shapes and output specifications. If the heat radiating structures in the past are to be used with different types of lamps, then it is necessary to redesign the heat radiating structures in their entirety. Furthermore, since the heat sink of the heat radiating structures in the past is of a unitary structure, its shape is limited by casting and machining restrictions, and the heat sink needs to be made of the same material throughout, resulting in a high total cost.

It is desirable for the present invention to provide a heat radiating structure which can be used with a plurality of types of lamps having different shapes and output specifications, and which is of a low total cost.

In order to meet the above demand, there is provided in accordance with the present invention a heat radiating structure for radiating the heat generated by a lamp in an image projecting apparatus for projecting an image onto a screen to display the image thereon, including a heat sink for radiating heat generated by the lamp, the heat sink including heat transfer means for transferring the heat from the lamp, the heat transfer means being held in close contact with the lamp, heat storage means for storing the heat transferred from the lamp through the heat transfer means, and a plurality of fins serving as heat radiating means for radiating the heat stored by the heat storage means, wherein the heat transfer means, the heat storage means, and the heat radiating means are of a separable structure.

According to the present invention, the heat transfer means is shaped complementarily to the lamp, and is replaceable depending on the lamp used. Therefore, the heat sink can easily be used with a plurality of different types of lamps having different shapes. Heat radiating means having different heat radiating areas and different materials may be used depending on the temperature to which the lamp is heated. Consequently, the heat radiating structure can easily be used with a plurality of different types of lamps having different output specifications. According to the present invention, furthermore, the heat transfer means, the heat storage means, and the heat radiating means are of a separable structure, components thereof may be available in various shapes and materials, and the heat radiating structure may be of a low total cost while maintaining a high heat radiating capability.

The above and other features and advantages of the present invention will become apparent from the following description when taken in conjunction with the accompanying drawings which illustrate a preferred embodiment of the present invention by way of example.

DETAILED DESCRIPTION OF THE PREFERRED EMBODIMENTS

Figure 1:
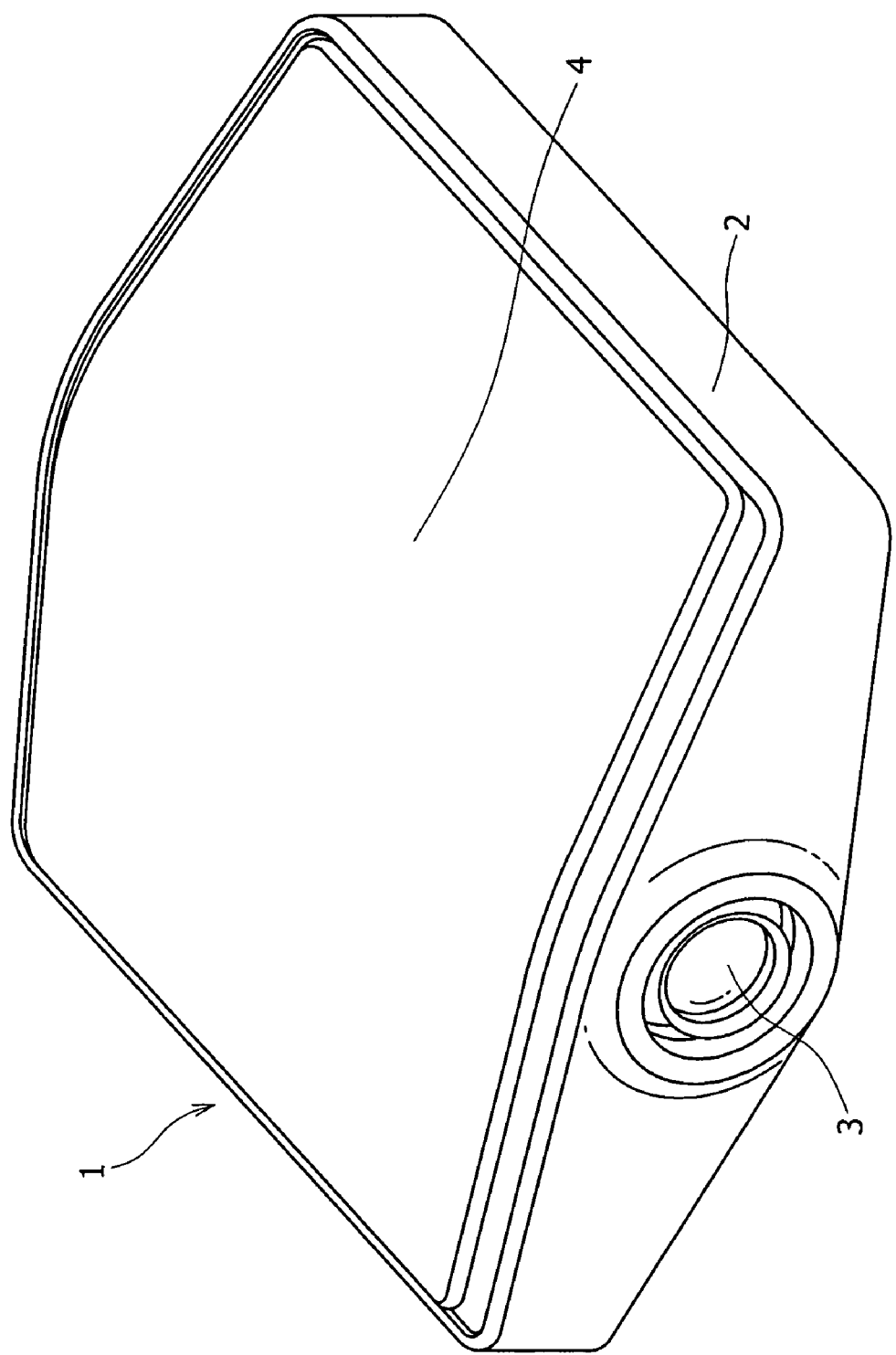
FIG. 1 is a perspective view of an image projecting apparatus.

FIG. 1 shows in perspective an image projecting apparatus 1, or in other words, a video projector, to which the principles of the present invention are applicable. As shown in FIG. 1, the image projecting apparatus 1 has a housing 2 incorporating therein a lamp as a light source, an optical system for modulating light emitted from the lamp, and a cooling section for cooling the lamp and the optical system. The image projecting apparatus 1 projects image light which has been modulated by the optical system from a front projecting lens 3 onto a front screen, not shown, to display the image thereon.

The housing 2 includes a separate top cover 4 shaped to cover an upper surface of the housing 2 substantially in its entirety. The top cover 4 is slidable along the fore-and-aft axis of the housing 2 to selectively open and close the housing 2.

Figure 2:
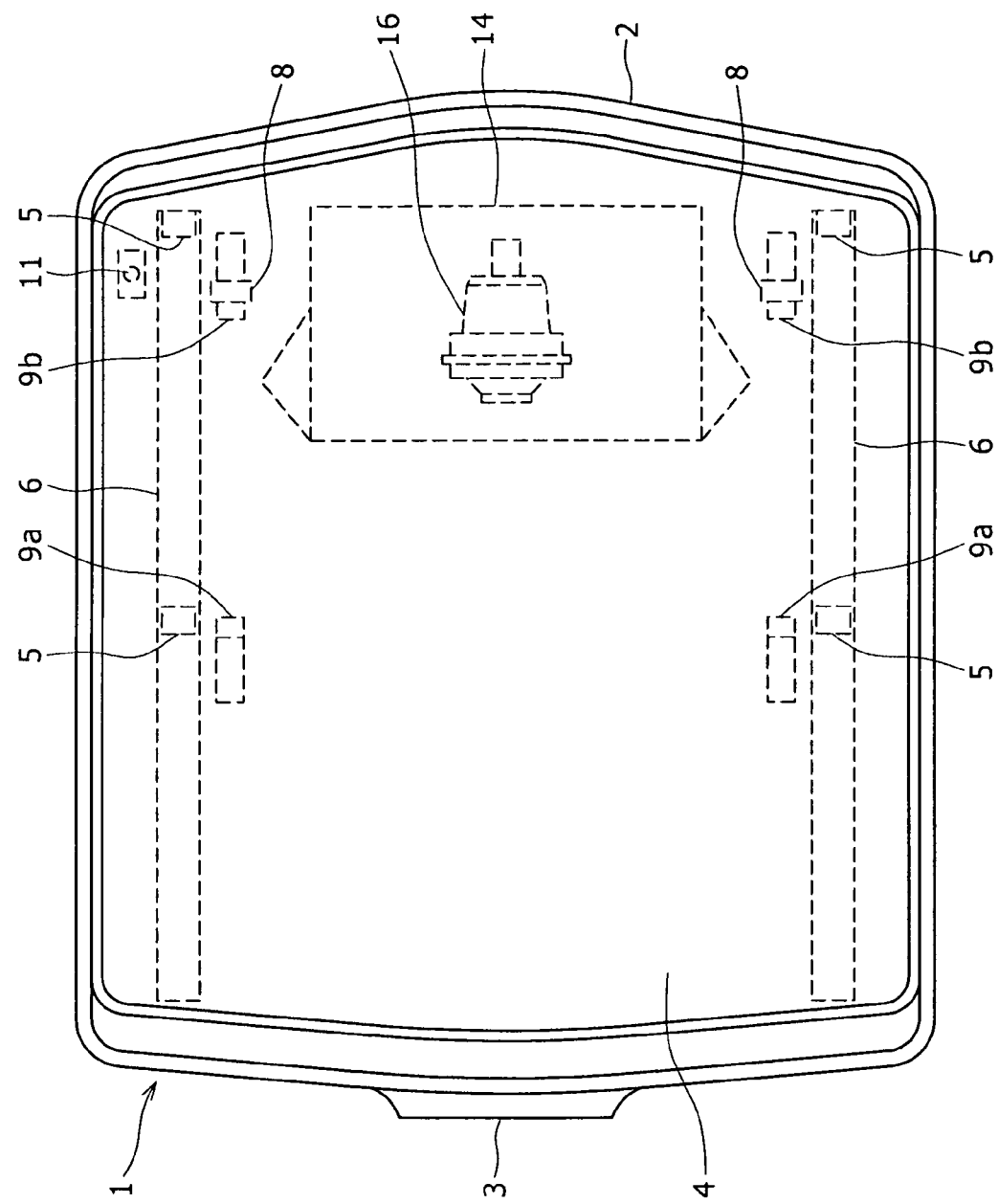
FIG. 2 is a plan view of the image projecting apparatus.
Figure 3:
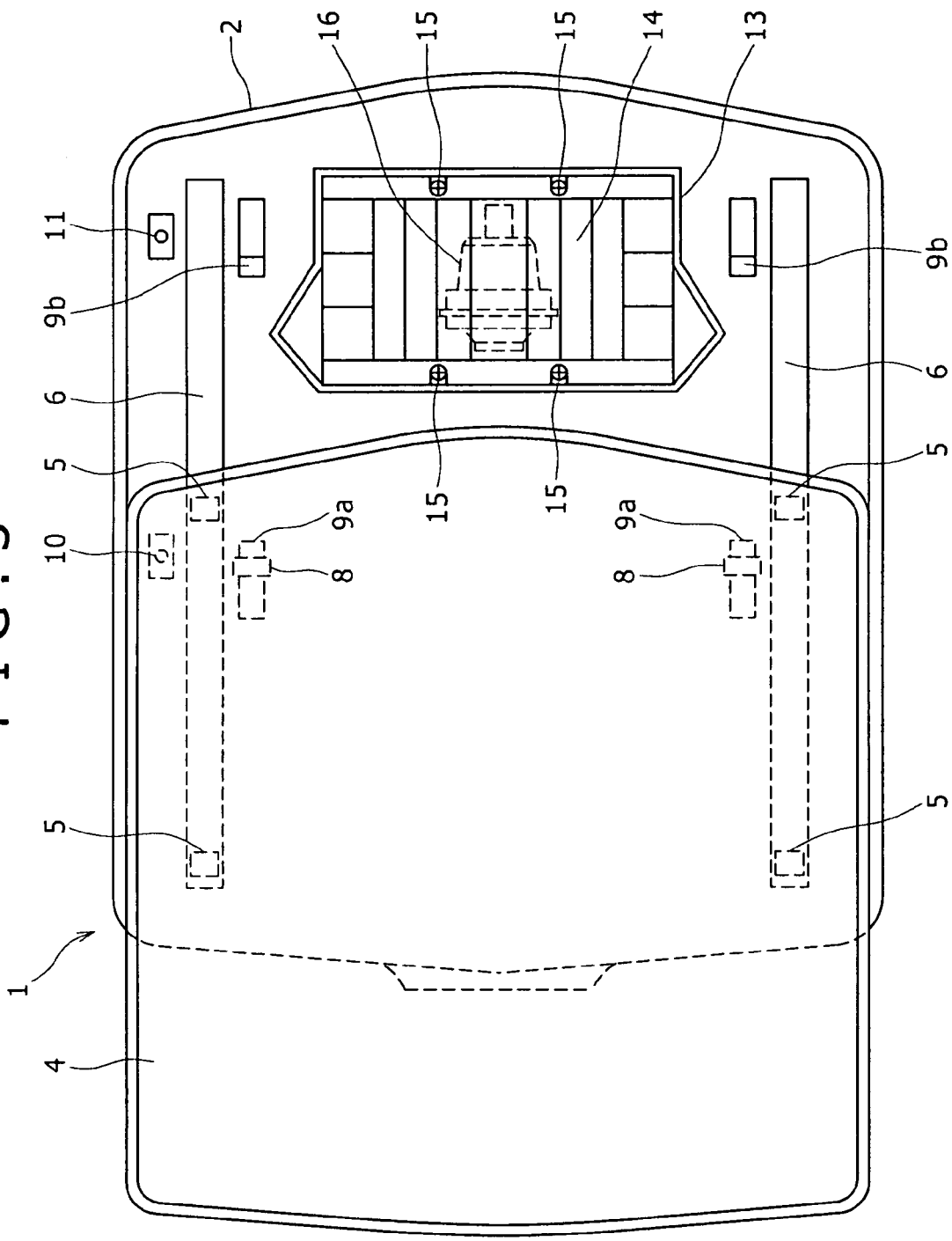
FIG. 3 is a plan view of the image projecting apparatus, with a top cover thereof being partly open.

FIG. 2 shows in plan the image projecting apparatus 1 with the housing 2 being closed by the top cover 4. FIG. 3 shows in plan the image projecting apparatus 1 with the housing 2 being partly open by the top cover 4 which has slid forwards. As shown in FIG. 3, when the housing 2 being partly open by the top cover 4 which has slid forwards, a lamp unit storage 13 storing a lamp unit 14 having a lamp 16 as a light source is exposed from an upper rear area of the housing 2.

An opening and closing section for selectively opening and closing the top cover 4 will be described below. The opening and closing section includes a rolling mechanism 5 mounted on the reverse side of the top cover 4 and two guide rails 6 mounted on an upper surface of the housing 2 in alignment with the rolling mechanism 5 and serving as a guide section for guiding the rolling mechanism 5.

The rolling mechanism 5 includes four rollers, i.e., two rollers in front left and right positions on the reverse side of the top cover 2 and two rollers in rear left and right positions on the reverse side of the top cover 2. The guide rails 6 extend in fore-and-aft directions respectively in left and right areas of the upper surface of the housing 2. When the rollers roll on and along the guide rails 6, the top cover 4 slides fore and aft with respect to the housing 2 to selectively open and close the housing 2.

The image projecting apparatus 1 also has a light lock mechanism for locking the top cover 4 under a light retaining force in the position where the top cover 4 is open and also the position where the top cover 4 is closed. The light lock mechanism includes two engaging teeth 8 mounted on the reverse side of the top cover 4 and two pairs of front and rear engaging hooks 9a, 9b mounted on the upper surface of the housing 2 in alignment with the engaging teeth 8. When the top cover 4 is open (see FIG. 3), the engaging teeth 8 engage the respective front engaging hooks 9a, lightly locking the top cover 4 in the open position. When the top cover 4 is closed (see FIG. 2), the engaging teeth 8 engage the respective rear engaging hooks 9b, lightly locking the top cover 4 in the closed position. To release the top cover 4 from either one of the lightly locked positions, the user may push the top cover 4 with a slightly strong force to cause the top cover 4 to slide, forcing the engaging teeth 8 to disengage from the engaging hooks 9a, 9b while the engaging hooks 9a, 9b are flexing.

The image projecting apparatus 1 also has a lock mechanism for completely locking the top cover 4 when the top cover 4 is closed. The lock mechanism includes a lock hole 10 defined in the reverse side of the top cover 4 and a lock pin 11 projecting from the upper surface of the housing 2 in alignment with the lock hole 10. When the top cover 4 is completely closed, the lock pin 11 is inserted into the lock hole 10, locking the top cover 4 against sliding movement with respect to the housing 2. For unlocking the top cover 4, the user presses an unlock button (not shown) on the bottom of the housing 2 to pull the lock pin 11 out of the lock hole 10.

When the unlocked top cover 4 is slid forwards, the lamp unit 14 that is removably stored in the lamp unit storage 13 in the housing 2 is exposed, as shown in FIG. 3. The lamp unit 14 is fastened to the housing 2 by screws 15. For replacing the lamp 16 which is dead, the screws 15 are removed by a tool such as a screwdriver or the like, and the lamp unit 14 is taken out upwards from the lamp unit storage 13. Therefore, the lamp unit 14 can easily be replaced with a new lamp unit. After the lamp unit 14 is replaced, the top cover 4 is slid backwards to the closed position. After the top cover 4 is completely closed, the top cover 4 is locked by the lock mechanism.

Since the lamp unit 14 is replaced by opening and closing the top cover 4 with respect to the housing 2, the appearance of the image projecting apparatus 1 remains undamaged. The lamp unit 14 can smoothly be replaced without the need for a hard labor to turn the image projecting apparatus 1 upside down for lamp replacement.

The lamp 16 used in the image projecting apparatus 1 will be described below. The lamp 16 includes a xenon lamp having a lamp bulb filled with a xenon gas under a high pressure ranging from 20 to 200 atmospheric pressures. The lamp 16 emits light due to an electric discharge caused when a voltage is applied across the high-pressure xenon gas.

Figure 4:
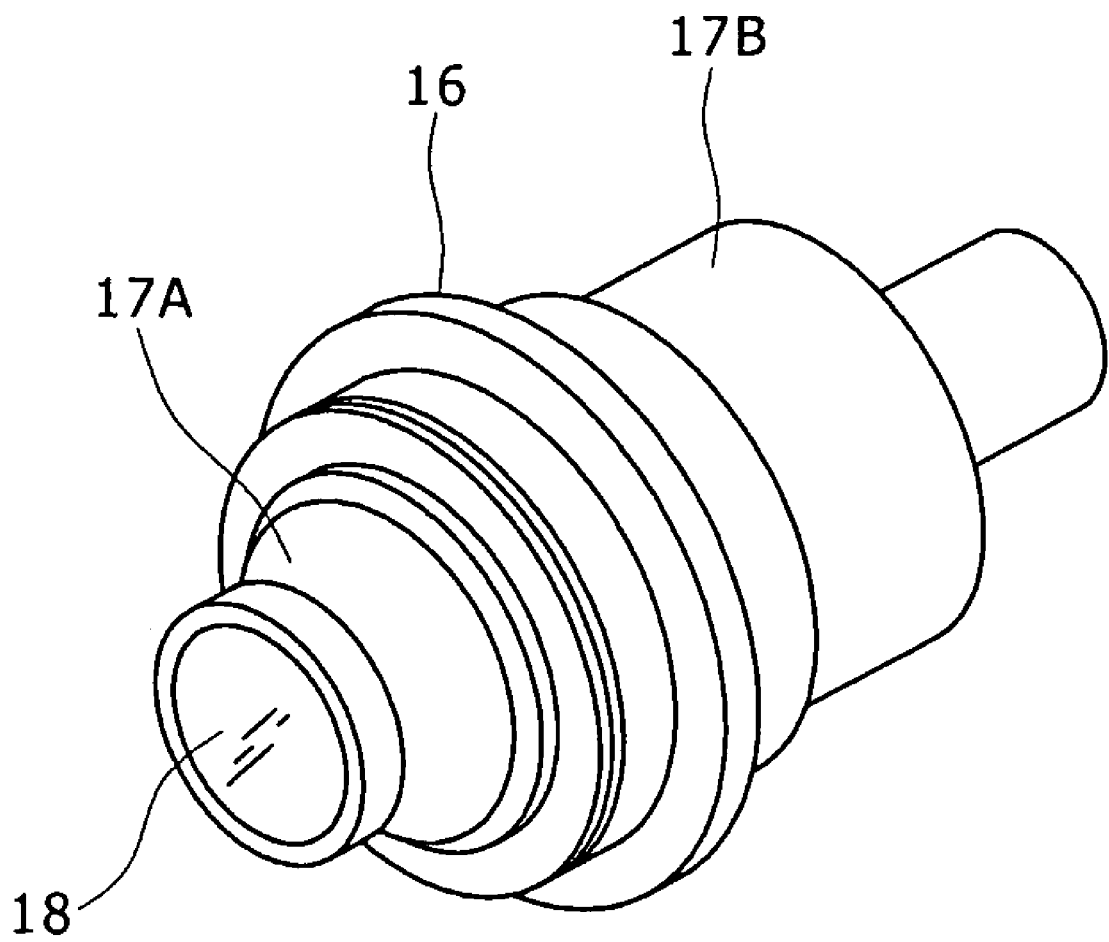
FIG. 4 is a perspective view of a lamp as a light source of the image projecting apparatus.

The lamp 16 is shown in perspective in FIG. 4. The lamp 16 has a casing constructed of a front case 17A and a rear case 17B that are joined to each other. The casing is filled with the high-pressure xenon gas. Each of the front case 17A and the rear case 17B is made of metal, with an insulation interposed between the front case 17A and the rear case 17B. The front case 17A and the rear case 17B serve as respective electrodes. Specifically, the front case 17A serves as a negative electrode in its entirety, and the rear case 17B as a positive electrode in its entirety. When a drive voltage is applied between the front case 17A and the rear case 17B, an electric discharge is produced in the high-pressure xenon gas, emitting light that is radiated from an exit port 18 of sapphire glass on the front end of the front case 17A.

The lamp 16 is an electric heating element whose temperature rises as it emits light. The lamp unit 14 includes a heat radiating structure in the form of a heat sink of metal for efficiently radiating the heat of the lamp 16.

Figure 5:
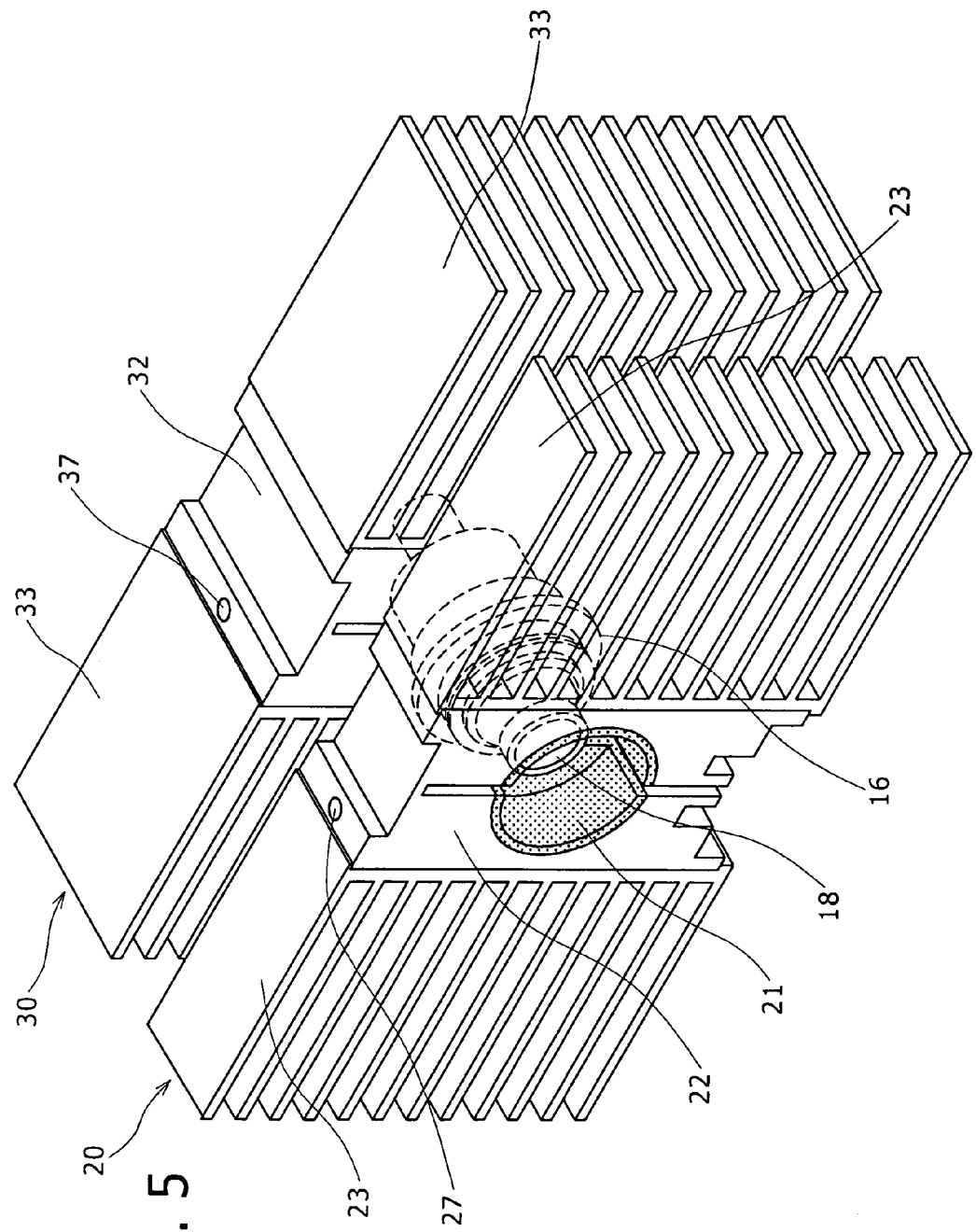
FIG. 5 is a perspective view of a heat radiating structure according to an embodiment of the present invention, which is combined with the lamp in image projecting apparatus.
Figure 6:
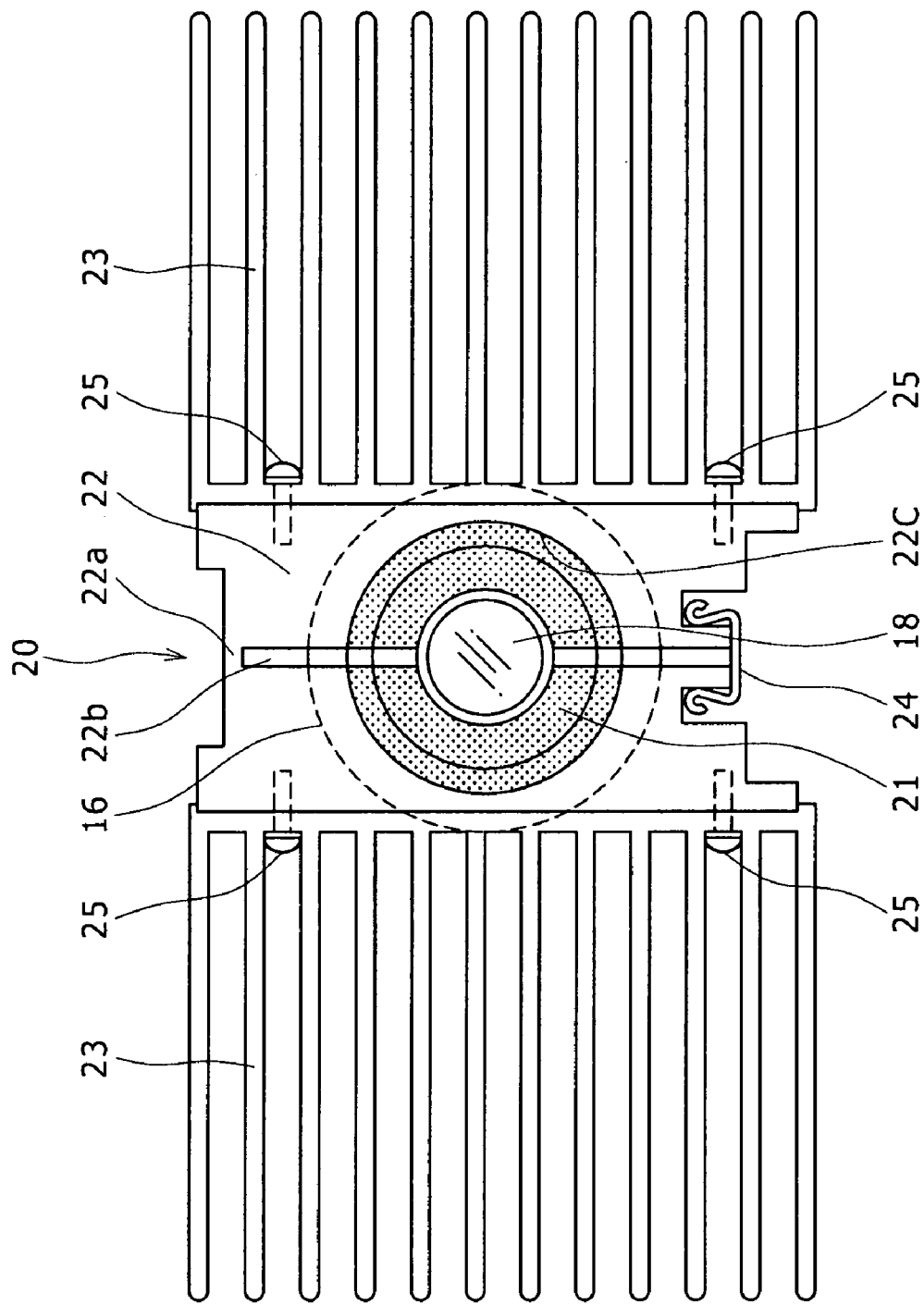
FIG. 6 is a front elevational view of the heat radiating structure.
Figure 7:
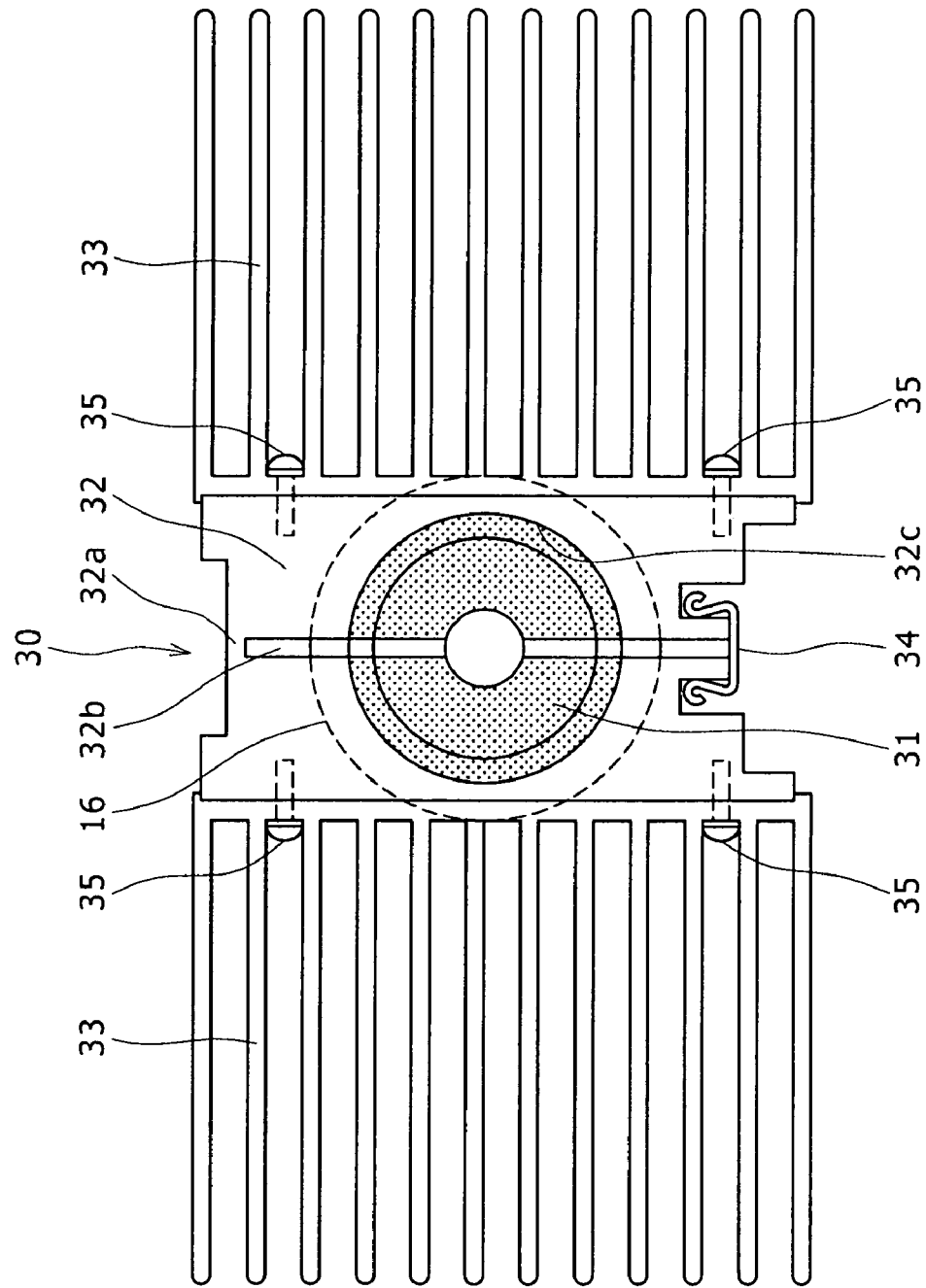
FIG. 7 is a rear elevational view of the heat radiating structure.
Figure 8:
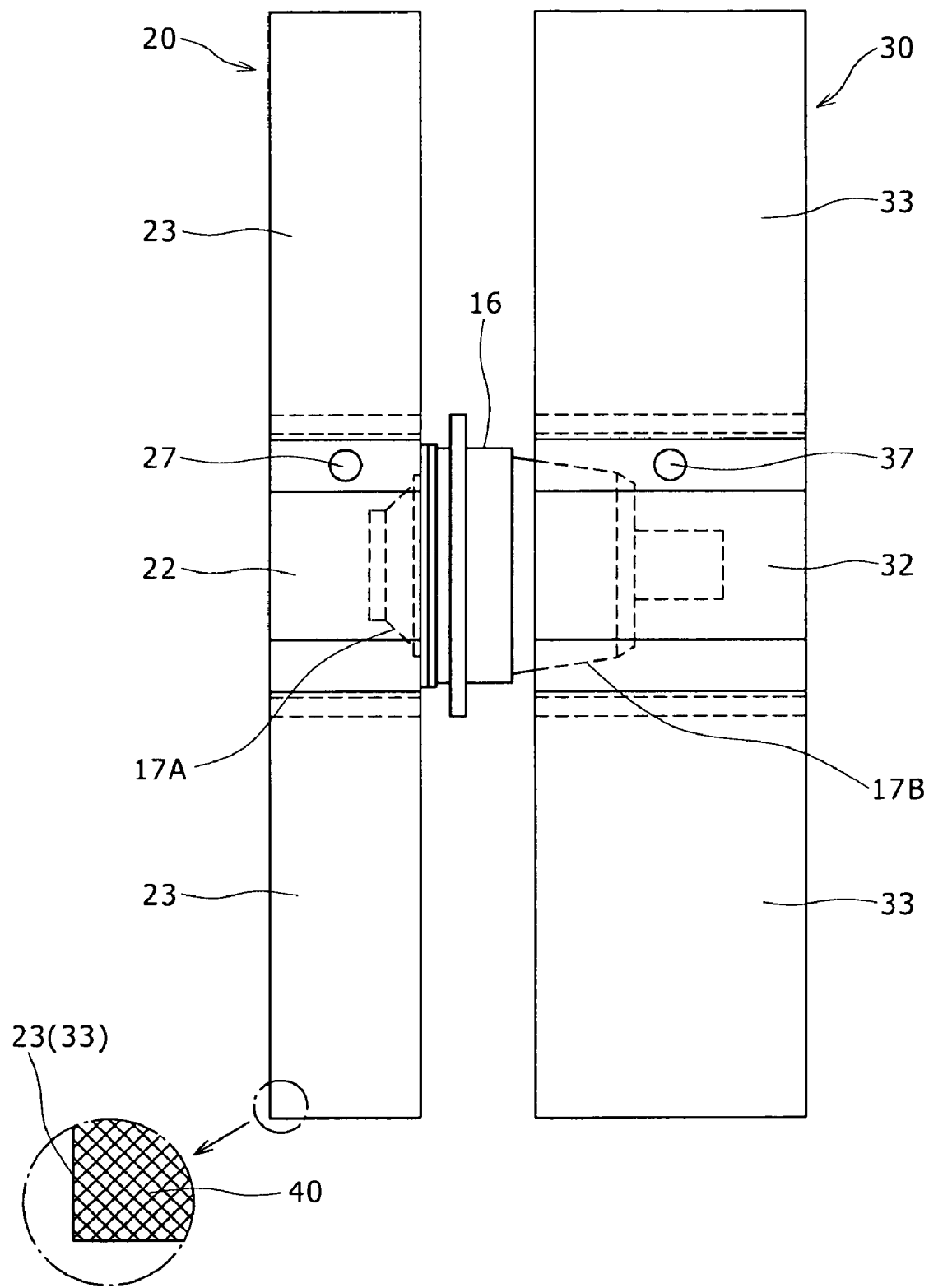
FIG. 8 is a plan view of the heat radiating structure.
Figure 9:
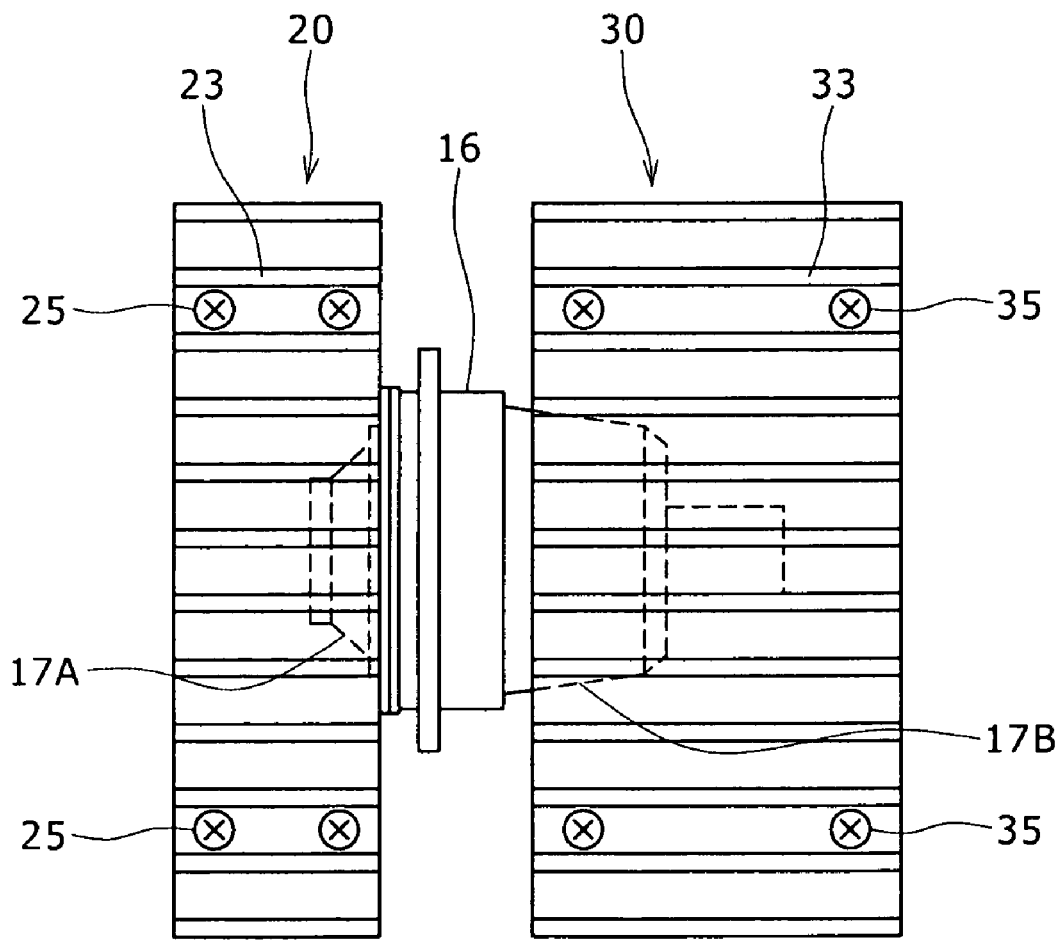
FIG. 9 is a side elevational view of the heat radiating structure.
Figure 10:
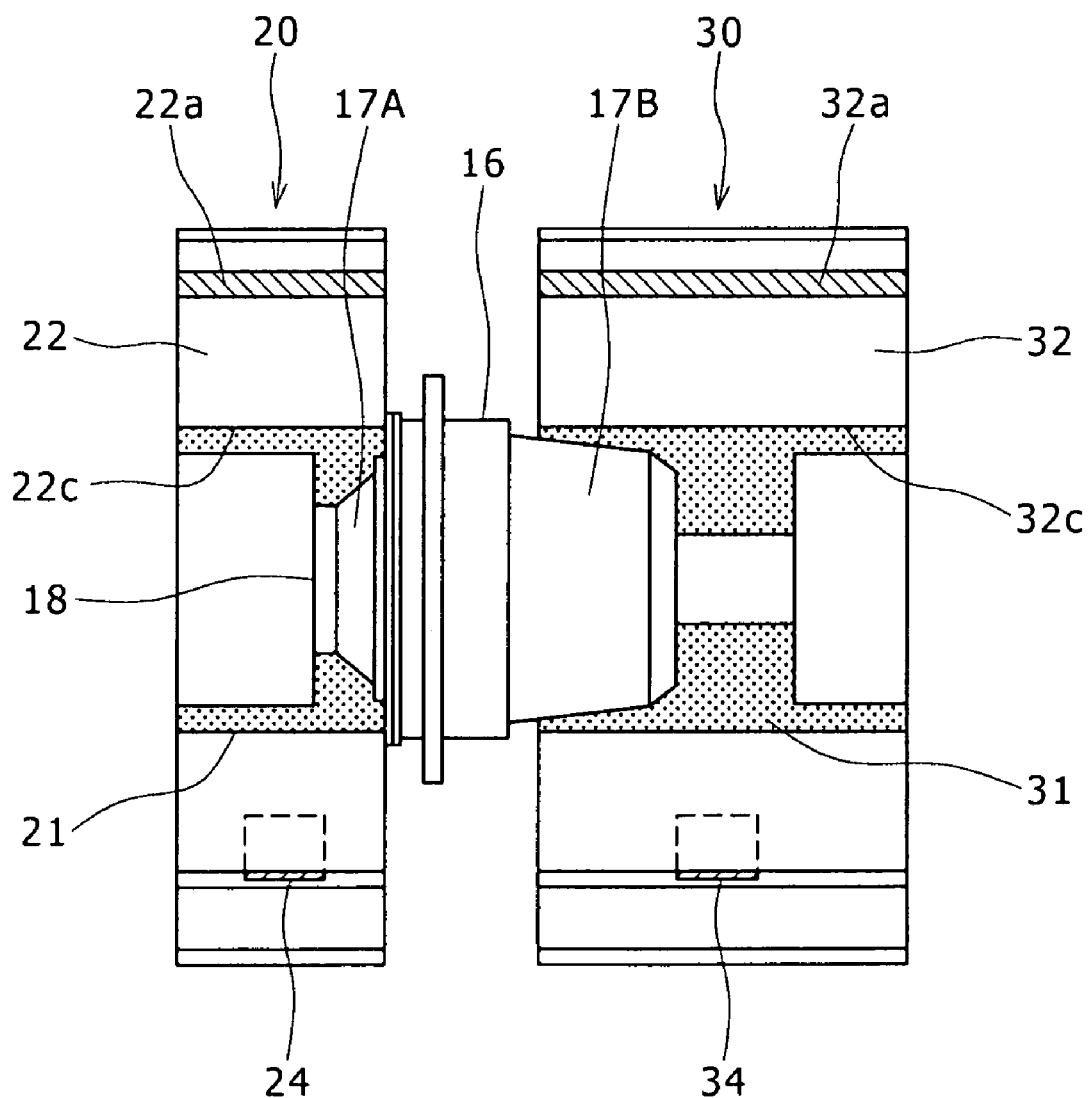
FIG. 10 is a side elevational view, partly in vertical cross section, of the heat radiating structure.

Details of the heat radiating structure are shown in FIGS. 5 through 10. FIG. 5 shows the heat radiating structure in perspective as viewed obliquely from front. FIG. 6 shows the heat radiating structure in front elevation. FIG. 7 shows the heat radiating structure in rear elevation. FIG. 8 shows the heat radiating structure in plan. FIG. 9 shows the heat radiating structure in side elevation. FIG. 10 shows the heat radiating structure in side elevation partly in vertical cross section. The heat sink includes a front heat sink 20 and a rear heat sink 30 which separately fitted over the front case 17A and the rear case 17B, respectively, of the lamp 16.

The front heat sink 20 and the rear heat sink 30 have respective attachments 21, 31 serving as a heat transfer section held in close contact with the lamp 16, respective base blocks 22, 32 serving as a heat storage section for storing the heat that is transferred from the lamp 16 through the attachments 21, 31, and respective sets of fins 23, 33 serving as a heat radiating section for radiating the heat that has been stored by the base clocks 22, 32. These components of the front heat sink 20 and the rear heat sink 30 are separably combined with each other.

As shown in FIGS. 6, 7, and 10, the base blocks 22, 32 are divided by respective central grooves 22b, 32b into respective left and right divided segments which are connected by connectors 22a, 32a at upper ends of the base blocks 22, 32. The divided left and right segments have recesses 22c, 32c defined therein across the central grooves 22b, 32b. The lamp 16 is fitted in the recesses 22c, 32c by respective attachments 21, 31, and clamp springs 24, 34 are mounted on the lower ends of the divided left and right segments, causing the divided left and right segments to tighten the lamp 16.

The attachments 21, 31 that are interposed between the lamp 16 and the base blocks 22, 32 are partly cylindrical in shape, and have inner circumferential surfaces shaped complementarily to the outer shapes of the front and rear cases 17A, 17B of the lamp 16 and outer circumferential surfaces shaped complementarily to the recesses 22c, 32c in the base blocks 22, 32. Therefore, the lamp 16 and the base blocks 22, 32 are sufficiently held in close contact with each other. The attachments 21, 31 can easily be replaced with other attachments depending on the lamp 16 that is used.

The fins 23, 33 serving as a heat radiating section include a number of heat radiating fins. The fins 23, 33 are oriented in directions perpendicular to the optical axis of the lamp 16 and disposed symmetrically with respect to the base blocks 22, 32. The fins 23, 33 are detachably fastened to the base blocks 22, 32 by screws 25, 35.

The attachments 21, 31, the base blocks 22, 32, and the fins 23, 33 of the heat sinks 20, 30 are made of a metal such as aluminum, copper, or the like which has high thermal conductivity. The heat transferred from the lamp 16 through the attachments 21, 31 is stored in the base blocks 22, 32, and the stored heat is radiated from the fins 23, 33. Therefore, the lamp 16 is efficiently cooled. Furthermore, a cooling fan incorporated as a cooling section in the image projecting apparatus 1 applies cooling air to the heat sinks 20, 30, more efficiently radiating the heat from the lamp 16 and preventing the temperature from unduly rising in the image projecting apparatus 1.

The attachments 21, 31 may be made of a material different from the base blocks 22, 32 and the fins 23, 33, e.g., copper of high thermal conductivity, and the base blocks 22, 32 may be made of inexpensive aluminum. With this arrangement, the heat radiating structure may be lower in cost and highly effective in radiating heat.

A heat transfer accelerating section such as silicone grease, a heat transfer sheet, or the like may be interposed between the lamp 16 and the attachments 21, 31 for better heat transfer from the lamp 16 to the base blocks 22, 32 for more efficient heat radiation. The heat transfer accelerating section may be interposed between the attachments 21, 31 and the base blocks 22, 32 for efficient heat radiation.

As shown in FIG. 8, the fins 23, 33 have surfaces knurled to produce grooves 40, providing small surface irregularities for the fins 23, 33 to have a greater area for contact with air for better heat radiation.

The heat sinks 20, 30 may be used with a plurality of types of lamps having different shapes by replacing the attachments 21, 31 depending on the lamp 16 to be used. Specifically, if the heat sinks 20, 30 are to be used with a lamp 16 having a different shape, then the existing attachments 21, 31 are replaced with other attachments shaped to match the lamp 16. Therefore, the heat sinks 20, 30 can be held in close contact with the lamp 16 for a desired cooling capability without the need for changing the heat radiating structure in its entirety.

Since the fins 23, 33 are removably mounted on the base blocks 22, 32, fins 23, 33 having a different heat radiating area and made of a different material may be used depending on the temperature to which the lamp 16 is heated, thereby allowing the heat sinks 20, 30 to be used with a plurality of types of lamps having different output specifications. Specifically, if the heat sinks 20, 30 are to be used with a lamp 16 having a greater output capability, i.e., generating a greater amount of heat, then the existing fins 23, 33 are replaced with fins 23, 33 having a greater heat radiating area or made of a material having a greater heat radiating capability. Therefore, the heat sinks 20, 30 can maintain a high cooling capability while at the same time keeping the heat radiating structure unchanged in its entirety.

With the heat radiating structure according to the present embodiment, since the fins 23, 33 extend horizontally, the vertical dimension, i.e., the thickness, of the lamp unit 14 incorporating the fins 23, 33 is relatively small. Even if the heat sinks 20, 30 are used with a lamp 16 having a different shape or output specifications, the vertical dimension of the lamp unit 14 remains unchanged though the attachments 21, 31 and the fins 23, 33 may be changed. Therefore, the heat radiating structure can be used with a plurality of types of lamps without the need for major design changes such as changes in the appearance.

Because the attachments 21, 31, the base blocks 22, 32, and the fins 23, 33 are of a separable structure, casting and machining restrictions on those components are much smaller than if the components are of a unitary structure. As the components may thus be available in various shapes and materials, the heat radiating structure may be of a low total cost while maintaining a high heat radiating capability.

Figure 11:
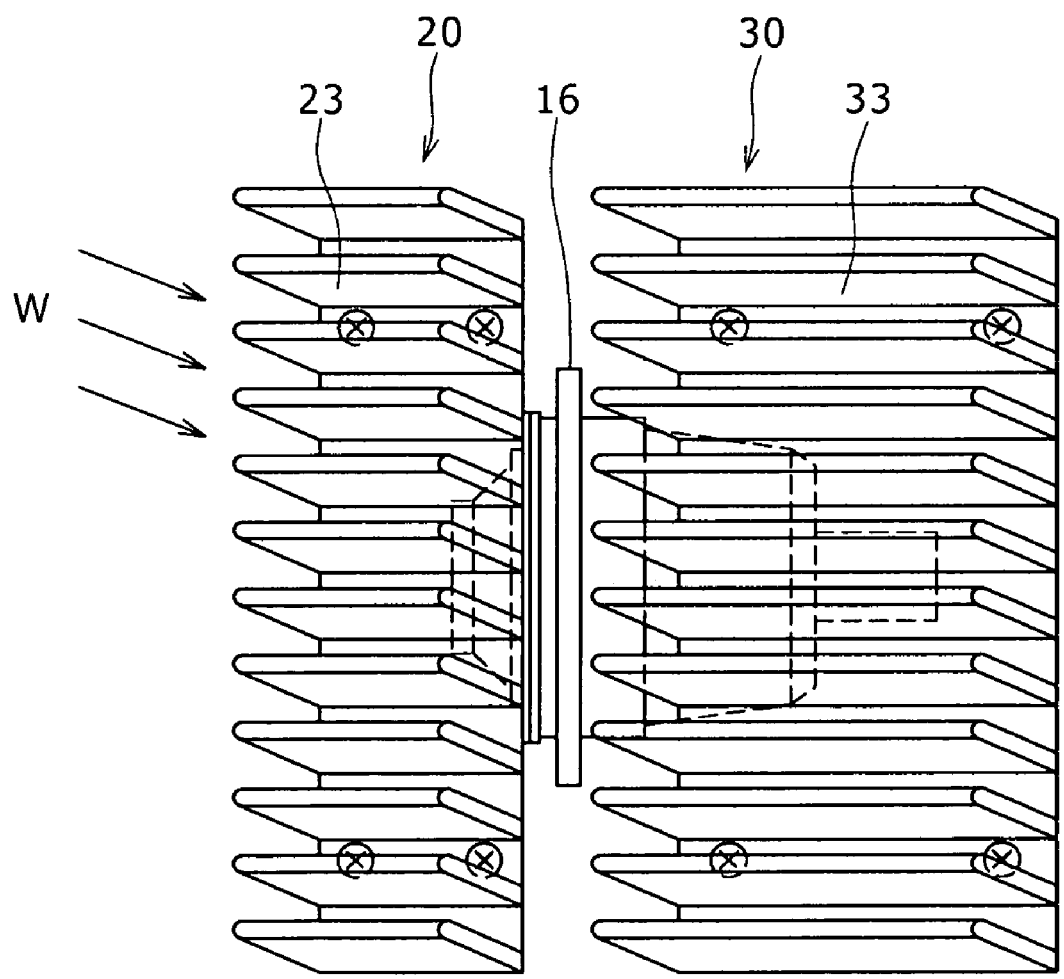
FIG. 11 is a side elevational view of a heat radiating structure according to another embodiment of the present invention.

FIG. 11 shows a heat radiating structure according to another embodiment of the present invention. The heat radiating structure shown in FIG. 11 includes fins 23, 33 having a modified shape. In FIG. 11, the fins 23, 33 are inclined at an angle to the base blocks so as to be oriented in the direction in which cooling air W from a cooling fan is applied obliquely to the heat sinks 20, 30. Accordingly, the cooling air W from the cooling fan flows smoothly between the fins 23, 33 for effectively and efficiently cooling the lamp 16.

As shown in FIGS. 5 and 8, electrode terminals 27, 37 serving as a voltage applying section for applying a voltage to the lamp 16 are mounted on the base blocks 22, 32, respectively. A power supply circuit, not shown, has output terminals connected respectively to the electrode terminals 27, 37. The voltage supplied from the power supply circuit is applied from the electrode terminals 27, 37 through the base blocks 22, 32 and the attachments 21, 31 to the front and rear cases 17A, 17B which serve as the electrodes of the lamp 16, thereby energizing the lamp 16. The electrode terminals 27, 37 are sufficiently insulated from each other by an air layer that is present between the heat sinks 20, 30.

Although certain preferred embodiments of the present invention have been shown and described in detail, it should be understood that various changes and modifications may be made therein without departing from the scope of the appended claims.

What is claimed is:

1. A heat radiating structure for radiating the heat generated by a lamp in an image projecting apparatus for projecting an image onto a screen to display the image thereon, comprising:
   a heat sink for radiating heat generated by said lamp;
   said heat sink including:
   heat transfer means for transferring the heat from said lamp, said heat transfer means being held in close contact with said lamp;
   heat storage means for storing the heat transferred from said lamp through said heat transfer means, said heat storage means directly contacting and substantially surrounding said heat transfer means;
   a plurality of fins serving as heat radiating means for radiating the heat stored by said heat storage means;
   wherein said heat transfer means, said heat storage means, and said heat radiating means are of a separable structure;
   heat transfer accelerating means disposed between said lamp and said heat transfer means; and
   wherein the heat transfer accelerating means includes silicon grease.

2. The heat radiating structure according to claim 1, wherein said heat transfer means is shaped complementarily to said lamp, and is replaceable depending on the lamp used.

3. The heat radiating structure according to claim 1, wherein said heat radiating means is removably mounted on said heat storage means so that heat radiating means having a different heat radiating area and made of a different material may be mounted on said heat storage means depending on the temperature to which said lamp is heated.

4. The heat radiating structure according to claim 1, wherein said heat transfer means is made of a material different from said heat storage means and said heat radiating means.

5. The heat radiating structure according to claim 1, further comprising:
heat transfer accelerating means disposed between said heat transfer means and said heat storage means.

6. The heat radiating structure according to claim 1, wherein said heat radiating means has small surface irregularities on a surface thereof.

7. The heat radiating structure according to claim 1, wherein said heat radiating means is inclined at an angle to said heat storage means so as to be oriented in a direction in which cooling air from a cooling fan is applied to said heat radiating means.

8. The heat radiating structure according to claim 1, wherein said heat storage means has voltage applying means for applying a voltage between electrodes of said lamp.

9. The heat radiating structure according to claim 8, wherein said voltage applying means has electrode terminals for applying said voltage, said electrode terminals being insulated from each other by an air layer.

10. The heat radiating structure according to claim 1, wherein said lamp further includes a casing filled with high-pressure xenon gas.

11. The heat radiating structure according to claim 1, wherein said lamp further includes a front casing and a rear casing that serve as electrodes.

12. The heat radiating structure according to claim 1, wherein the plurality of fins are oriented in a direction perpendicular to an optical axis of the lamp and are disposed symmetrically with respect to the heat storage means.

13. The heat radiating structure according to claim 1, wherein the plurality of fins are detachably fastened to the heat storage means by screws.

14. The heat radiating structure according to claim 1, further comprising a cooling fan wherein the cooling fan provides cooling air obliquely to heat storage means.

15. A heat radiating structure for radiating the heat generated by a lamp in an image projecting apparatus for projecting an image onto a screen to display the image thereon, comprising:
a heat sink for radiating heat generated by said lamp;
said heat sink including:
heat transfer means for transferring the heat from said lamp, said heat transfer means being held in close contact with said lamp;
heat storage means for storing the heat transferred from said lamp through said heat transfer means, said heat storage means directly contacting and substantially surrounding said heat transfer means;
a plurality of fins serving as heat radiating means for radiating the heat stored by said heat storage means;
wherein said heat transfer means, said heat storage means, and said heat radiating means are of a separable structure;
wherein said heat transfer means further includes an external surface, said heat storage means further includes a internal and external surfaces, and said heat radiating means further includes a internal surface; and
wherein said external surface of said heat transfer means directly contacts said internal surface of said heat storage means and said external surface of said heat storage means directly contacts said internal surface of said heat radiating means.

16. The heat radiating structure according to claim 15, wherein the external surface of said heat transfer means are substantially cylindrical, the internal surface of said heat storage means is substantially cylindrical, the external surface of said heat storage means is substantially planer, and the internal surface of said heat radiating means is substantially planer.

17. The heat radiating structure according to claim 1, further comprising, a housing that substantially encapsulates said lamp and said heat sink and wherein said housing includes a cover that can be opened to replace said lamp.

* * * * *